R. D. JEFFRIES.
SAFETY DEVICE FOR TRACTORS.
APPLICATION FILED JAN. 10, 1920.

1,384,957. Patented July 19, 1921.
2 SHEETS—SHEET 1.

Inventor
R. D. Jeffries
By Victor J. Evans
Attorney

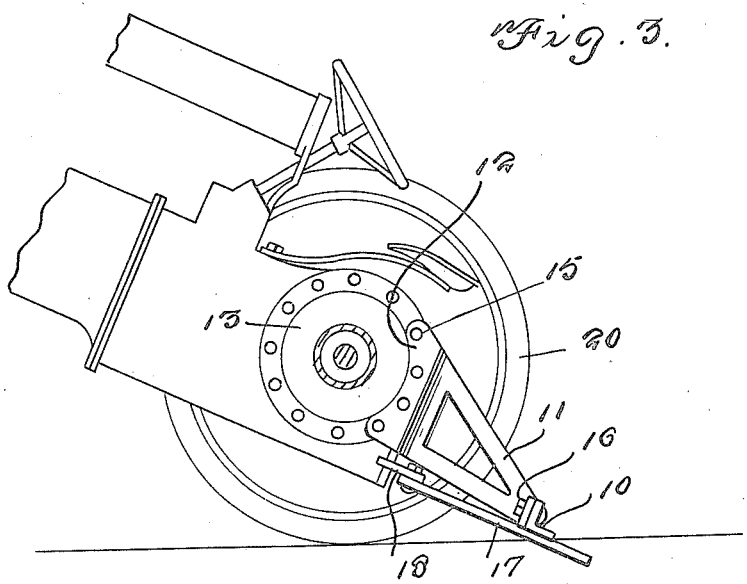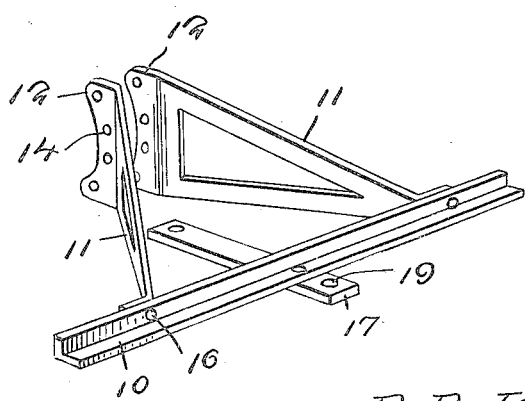

UNITED STATES PATENT OFFICE.

ROY D. JEFFRIES, OF GRANADA, MINNESOTA.

SAFETY DEVICE FOR TRACTORS.

1,384,957. Specification of Letters Patent. Patented July 19, 1921.

Application filed January 10, 1920. Serial No. 350,591.

*To all whom it may concern:*

Be it known that I, ROY D. JEFFRIES, a citizen of the United States, residing at Granada, in the county of Martin and State of Minnesota, have invented new and useful Improvements in Safety Devices for Tractors, of which the following is a specification.

The object of the invention is to provide a device which may be constructed in the form of an attachment for application to tractors and particularly those of the type shown commercially as the Fordson, to prevent the machine under severe strains from tilting or tipping backward to such an extent as to turn turtle at the risk of injuring either the machine or the operator or both, and to this end to provide means to serve as a check to limit the tilting movement or backward inclination of the tractor and at the same time to leave or reduce the tractive effect of the driving wheels upon the soil, so as to check the forward impulse of the latter and hence permit the machine to resume its normal position.

To these ends the invention consists in a construction and combination of parts of which a preferred embodiment is illustrated in the accompanying drawing, it being understood however, particularly as to the means of attachment, that changes in form, proportion and details may be resorted to within the scope of the appended claims, without departing from the principles involved.

In the drawings:

Fig. 3 is a side view partly in section, showing the position of the safety or checking attachment when the tractor is tilted.

Fig. 4 is a perspective view of the attachment disconnected from the machine.

Figure 1:
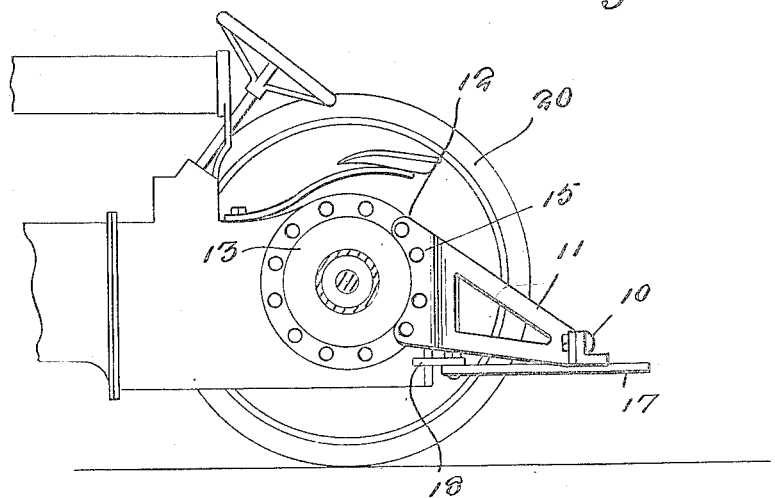
Figure 1 is a side view of the safety or checking attachment applied in the operative position to a tractor.
Figure 2:
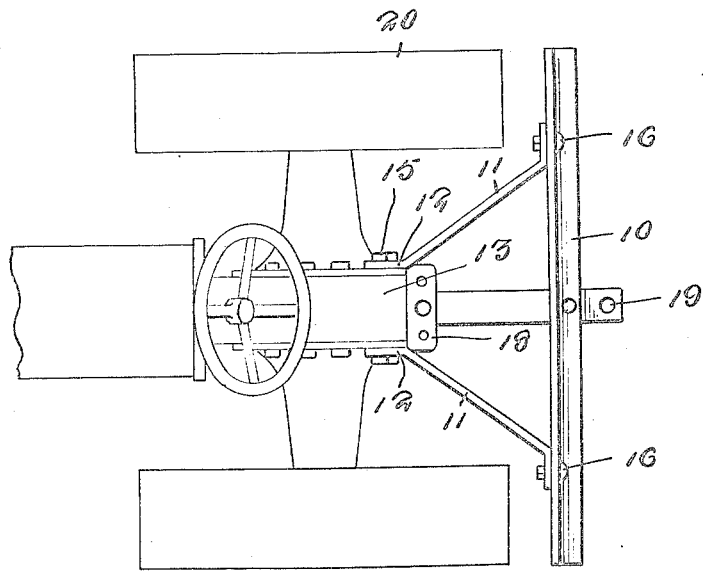
Fig. 2 is a plan view of the same.

The device consists essentially of the transverse beam or bar 10 which may as illustrated be of channel bar formation as indicated in the drawing, from which at intermediate points extends the forwardly convergent brace plates 11 having parallel front leads 12 adapted to lie in contact with opposite side faces of the gear casing 12 of the tractor, said leads being provided with bolt openings 14 for engagement by the cap screws 15 of the gear casing or by which the side plates of the gear casing are secured in place, to the end that the attachment may be applied to the ordinary tractor without modifying the construction of the latter, and by utilizing fastening means which already form parts of the commercial tractor.

Any suitable and efficient means of attachment of the reduced rear ends of the braces to the transverse beam or bar may be employed, that which is illustrated in the drawing consisting of bolts 16, the ends of the braces being arranged in the channels of the beam.

The attachment is also provided with a central longitudinal disposed hitch bar 17 secured to the transverse check bar or beam 10 and adapted for attachment at the front end to the hitch eye or ring 18 of the tractor, said hitch bar in turn being provided at its rear end with a hitch eye or ring 19, so that the plow or other apparatus to be drawn by the tractor is connected with the apparatus through the auxiliary or supplemental hitch eye or ring 19 instead of to the means with which the tractor ordinarily is provided. This hitch bar in addition to communicating motion from the frame of the tractor to the mechanism to be drawn serves as a truss in connection with the other element of the attachment, to strengthen the attachment and the connection between the same and the tractor frame.

In the event that the tractor should rear or tilt backwardly, as occurs when the wheels strike an obstruction, the check bar or beam will engage the ground and serve as a prop to prevent the machine from falling backwardly.

It will be understood moreover without specific illustration that the device as described may be applied as a fender to a tractor or similar machine, in which event of course it would be unnecessary to use the hitch or tension bar 17.

What is claimed is:—

1. A safety attachment for tractors having a transverse check bar or beam, forwardly convergent braces provided at their front ends with parallel wings having openings for engagement by the cap screws of a gear casing and a hitch connected with the center of said check bar or beam.

2. A safety attachment for tractors comprising a pair of rearwardly diverging brackets disposed against opposite sides of the flanges of the differential housing on the rear axle of the tractor and secured by the bolts which hold the sections of the housing together, and a transverse bar secured to the rear ends of said brackets and adapted to engage the ground in the event of rearing of the tractor.

In testimony whereof I affix my signature.

ROY D. JEFFRIES.